United States Patent
Ku et al.

(10) Patent No.: US 10,082,854 B2
(45) Date of Patent: Sep. 25, 2018

(54) NETWORK DEVICE FOR SUPPLYING POWER OVER NETWORK AND OPERATION METHOD OF THE SAME

(71) Applicant: SENAO NETWORKS, INC., Taoyuan (TW)

(72) Inventors: Pi-Kuang Ku, Taoyuan (TW); Ming-Tao Chang, Taoyuan (TW); Wen-Tang Lee, Taoyuan (TW)

(73) Assignee: SENAO NETWORKS, INC., Taoyuan (TW)

( * ) Notice: Subject to any disclaimer, the term of this patent is extended or adjusted under 35 U.S.C. 154(b) by 265 days.

(21) Appl. No.: 15/261,869

(22) Filed: Sep. 9, 2016

(65) Prior Publication Data

US 2018/0074563 A1   Mar. 15, 2018

(51) Int. Cl.
*G06F 1/32* (2006.01)
*G06F 1/26* (2006.01)
*H04L 12/10* (2006.01)
*H04L 12/40* (2006.01)

(52) U.S. Cl.
CPC ............ *G06F 1/266* (2013.01); *G06F 1/3209* (2013.01); *G06F 1/3287* (2013.01); *H04L 12/10* (2013.01); *H04L 12/40045* (2013.01)

(58) Field of Classification Search
CPC ....................................................... G06F 1/266
See application file for complete search history.

(56) References Cited

U.S. PATENT DOCUMENTS

| | | | |
|---|---|---|---|
| 8,150,539 B2 | 4/2012 | Numano | |
| 2004/0189323 A1* | 9/2004 | Nagase | G01D 3/08 324/609 |
| 2010/0036991 A1* | 2/2010 | Lee | G06F 1/266 710/304 |
| 2011/0264942 A1* | 10/2011 | Tsukamoto | G06F 1/266 713/324 |

FOREIGN PATENT DOCUMENTS

TW    I368412 B    7/2012

* cited by examiner

*Primary Examiner* — Kim Huynh
*Assistant Examiner* — Eric Chang
(74) *Attorney, Agent, or Firm* — CKC & Partners Co., Ltd.

(57) ABSTRACT

A network device that includes a power source device (PSE) circuit, a MOS switch, a network connector and a detection unit is provided. The network connector has a first and a second terminal electrically coupled to the voltage source and to the ground terminal through the MOS switch respectively. Under the condition that the PSE circuit is not activated, the detection unit detects a first non-zero voltage pulse at the second terminal to determine that a powered device is attached to the network connector to activate the PSE circuit to generate and transfer the power to the powered device through the network connector. Under the condition that the PSE circuit is activated, the detection unit detects a second non-zero voltage pulse at the second terminal to determine that the powered device is detached from the network connector to deactivate the PSE circuit to stop generating the power.

18 Claims, 2 Drawing Sheets

NETWORK DEVICE FOR SUPPLYING POWER OVER NETWORK AND OPERATION METHOD OF THE SAME

BACKGROUND

Field of Disclosure

The present disclosure relates to a power transmission technology. More particularly, the present disclosure relates to a network device for supplying power over network and an operation method of the same.

Description of Related Art

Ethernet communications provide high speed data communications over a communications link between two communications nodes that operates according the IEEE 802.3 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) connected to the physical layer of the first node of the communications link provides DC power to a powered device (PD) at the second node of the communications link. The DC power is transmitted simultaneously over the same communications medium with the high speed data from one node to the other node.

However, a circuit for controlling the power-supplying mechanism in the power source device, such as a PSE chip, has to keep detecting whether the powered device is electrically coupled thereto to determine whether the power-supplying mechanism is activated. As a result, additional power consumption of the circuit for controlling the power-supplying mechanism is unavoidable.

Accordingly, what is needed is a network device for supplying power over network and an operation method of the same to reduce the power consumption in the network device.

SUMMARY

An aspect of the present disclosure is to provide a network device for supplying power over network. The network device includes a power source device (PSE) circuit, a MOS switch, a network connector and a detection unit. The PSE circuit is electrically coupled to a voltage source and a ground terminal. The MOS switch has a gate terminal electrically coupled to the PSE circuit and to receive a gate-driving voltage therefrom. The network connector has a first terminal electrically coupled to the voltage source and a second terminal electrically coupled to the ground terminal through the MOS switch. Under the condition that a power-supplying mechanism of the PSE circuit is not activated, the detection unit detects a first non-zero voltage pulse at the second terminal to determine that a powered device is attached to the network connector to activate the power-supplying mechanism of the PSE circuit to generate and transfer a power to the powered device through the network connector. Under the condition that the power-supplying mechanism of the PSE circuit is activated, the detection unit detects a second non-zero voltage pulse at the second terminal to determine that the powered device is detached from the network connector to deactivate the power-supplying mechanism of the PSE circuit to stop generating the power.

Another aspect of the present disclosure is to provide an operation method of a network device for supplying power over network comprising a PSE circuit electrically coupled to a voltage source and a ground terminal, a MOS switch having a gate terminal electrically coupled to the PSE circuit and to receive a gate-driving voltage therefrom, a network connector having a first terminal electrically coupled to the voltage source and a second terminal electrically coupled to the ground terminal through the MOS switch and a detection unit. The operation method includes the steps outlined below. A first non-zero voltage pulse is detected at the second terminal by the detection unit under the condition that a power-supplying mechanism of the PSE circuit is not activated. A powered device is determined to be attached to the network connector by the detection unit. The power-supplying mechanism of the PSE circuit is activated by the detection unit to generate and transfer a power to the powered device through the network connector. A second non-zero voltage pulse is detected at the second terminal by the detection unit under the condition that the power-supplying mechanism of the PSE circuit is activated. The powered device is determined to be detached from the network connector by the detection unit. The power-supplying mechanism of the PSE circuit is deactivated by the detection unit to stop generating the power.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the invention. Drawings are for the purpose of illustration only, and not plotted in accordance with the original size.

As used herein, the terms "first", "second" and the like, etc., are used to describe various elements, components, regions, layers and/or blocks can be understood. However, these elements, components, regions, layers and/or blocks should not be limited by these terms. The terms are used to identify a single element. Therefore, in the following a first element, component, region, layer, and/or blocks may also be termed a second element, component, region, layer, and/or blocks, without departing from the intent of the present disclosure.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
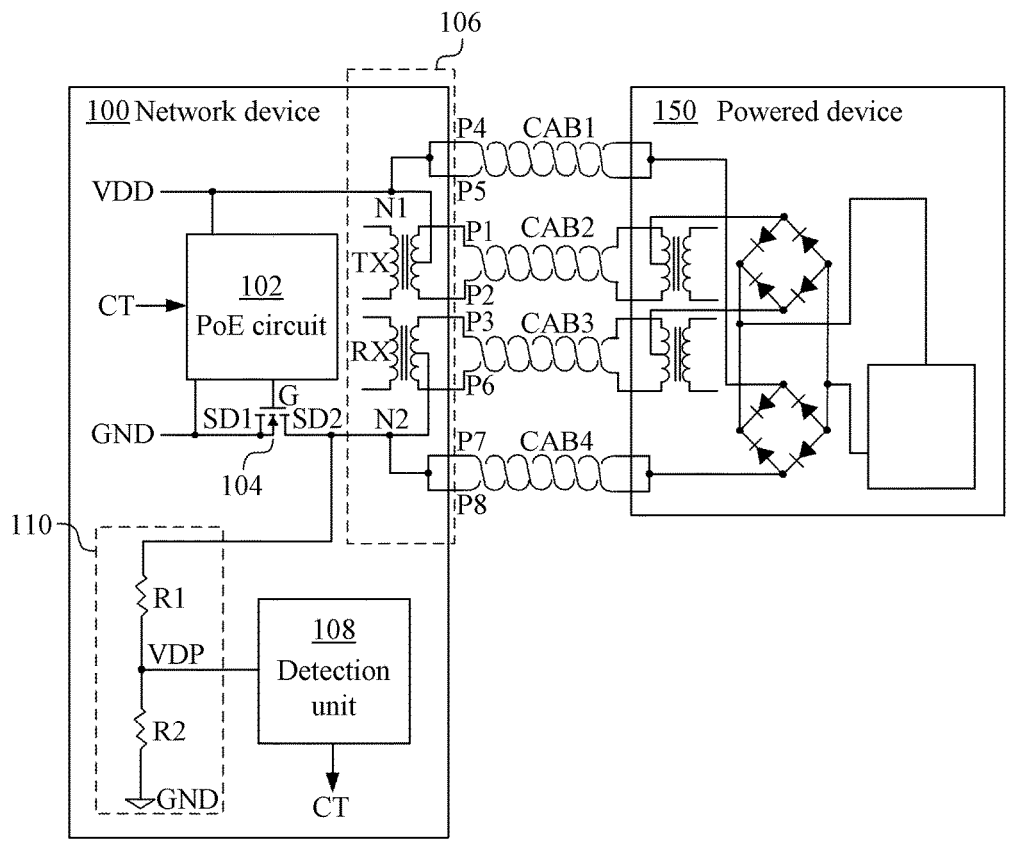
FIG. 1 is a block diagram of a network device for supplying power over network in an embodiment of the present disclosure.

FIG. 1 is a block diagram of a network device 100 for supplying power over network in an embodiment of the present disclosure. In an embodiment, the network device 100 is a power source device (PSE) equipped with Power over Ethernet (PoE) technology and configured to supply power and transfer communication signals to a powered device 150.

The network device 100 includes a power source device (PSE) circuit 102, a MOS switch 104, a network connector 106 and a detection unit 108.

The PSE circuit 102 is configured to control the power-supplying mechanism of the network device 100. In an embodiment, the PSE circuit 102 may include a controller (not illustrated) and a direct current (DC) voltage supply (not illustrated) such that the controller is able to activate the DC voltage supply to generate a power. The PSE circuit 102 is electrically coupled to a voltage source VDD and a ground terminal GND and is operated accordingly. The voltage source VDD may supply a voltage such as, but not limited to 54 volts. However, in different embodiments, the voltage source VDD may supply different levels of voltage.

The MOS switch 104 has a gate terminal G electrically coupled to the PSE circuit 102 and to receive a gate-driving voltage (not labeled) therefrom. The MOS switch 104 also includes source/drain terminals SD1 and SD2.

The network connector 106 has a first terminal N1 electrically coupled to the voltage source VDD and a second terminal N2 electrically coupled to the ground terminal GND through the MOS switch 104. More specifically, the source/drain terminal SD1 of the MOS switch 104 is electrically coupled to the ground terminal GND. The source/drain terminal SD2 of the MOS switch 104 is electrically coupled to the second terminal N2 of the network connector 106.

In an embodiment, the network connector 106 includes transformers each for transmission (labeled as TX) and reception (labeled as RX) and a connection port, such as a RJ45 connection port, that has a plurality of pins P1-P8. However, in different embodiments, the network connector 106 may include different configurations. The present disclosure is not limited thereto.

In an embodiment, the powered device 150 can be attached to the network connector 106 through cables, such as, but not limited to four twisted pair cables CAB1-CAB4. The detection unit 108 is configured to detect the voltage of the second terminal N2 to determine whether the powered device 150 is attached to or detached from the network connector 106.

In different embodiments, the detection unit 108 can be a microcontroller unit (MCU), an analog circuit or other circuit modules that is able to perform voltage detection.

In an embodiment, the network device 100 further includes a voltage-dividing ladder 110 electrically coupled between the second terminal N2 and the ground terminal GND. In the present embodiment, the voltage-dividing ladder 110 is a resistor ladder that includes a resistor R1 and a resistor R2 electrically coupled in series through a voltage-dividing point VDP. However, in other embodiments, each of the voltage-dividing elements included in the voltage-dividing ladder 110 can be a capacitor, an inductor or other possible electronic elements.

The detection unit 108 is substantially electrically coupled to the voltage-dividing point VDP to detect the voltage of the second terminal N2 since the voltage at the voltage-dividing point VDP is a divided voltage of the second terminal N2.

It is appreciated that in different embodiments, the resistor ladder 110 may include different numbers of resistors and different configurations. Moreover, in other embodiments, the detection unit 108 may either be directly coupled to the second terminal N2 without using the resistor ladder 110 or be coupled to the second terminal N2 through circuit modules other than the resistor ladder.

Figure 2:
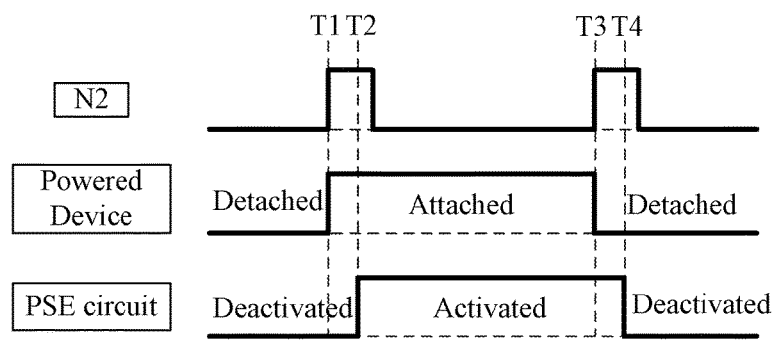
FIG. 2 is a diagram illustrating the status of the second terminal, the powered device and the PSE circuit in an embodiment of the present disclosure.

FIG. 2 is a diagram illustrating the status of the second terminal N2, the powered device 150 and the PSE circuit 102 in an embodiment of the present disclosure.

As illustrated in FIG. 2, the high level of the second terminal N2 stands for a non-zero voltage therein, and the low level of the second terminal N2 stands for a zero voltage therein. The high level of the powered device 150 stands for the condition that the powered device 150 is attached to the network connector 106 (illustrated as "attached"), and the low level of the powered device 150 stands for the condition that the powered device 150 is detached from the network connector 106 (illustrated as "detached"). The high level of the PSE circuit 102 stands for the condition that the power-supplying mechanism of the PSE circuit 102 is activated (illustrated as "activated"), and the low level of the PSE circuit 102 stands for the condition that the power-supplying mechanism of the PSE circuit 102 is deactivated (illustrated as "deactivated").

The detection mechanism of the detection unit 108 is described in detail in the following paragraphs in accompany with FIG. 1 and FIG. 2.

Under the condition that the power-supplying mechanism of the PSE circuit 102 is not activated, the detection unit 108 detects a first non-zero voltage pulse 200 (illustrated in FIG. 2) at the second terminal N2 at time T1 to determine that the powered device 150 is attached to the network connector 106.

In an embodiment, under the condition that the powered device 150 is attached to the network connector 106, the voltage of the voltage source VDD is transferred through the first terminal N1 of the network connector 106 through the inner circuitry of the powered device 150 to the second terminal N2 of the network connector 106 to induce the first non-zero voltage pulse 200. Under such a condition, the MOS switch 104 is turned off.

Such a pulse is detected by the detection unit 108 through the voltage-dividing point VDP of the resistor ladder 110. Subsequently, the detection unit 108 activates power-supplying mechanism of the PSE circuit 102 at time T2 to generate and transfer the power to the powered device 150 through the network connector 106. In an embodiment, the detection unit 108 may activate the power-supplying mechanism of the PSE circuit 102 by using such as, but not limited to a control signal CT.

In an embodiment, the current related to the first non-zero voltage pulse 200 is dissipated through the resistor ladder 110 such that under the condition that a voltage difference between the gate terminal G of the MOS switch 104 and the second terminal N2 is larger than a threshold voltage of the MOS switch 104, the MOS switch 104 is turned on such that the second terminal N2 receives a ground voltage of the ground terminal GND through the MOS switch 104. Under such a condition, the detection unit 108 does not detect the non-zero voltage pulse and does not control the PSE circuit 102.

Under the condition that the power-supplying mechanism of the PSE circuit 102 is activated, the detection unit 108 detects a second non-zero voltage pulse 202 at the second terminal N2 at time T3 to determine that the powered device 150 is detached from the network connector 106 to deactivate the PSE circuit 102.

In an embodiment, under the condition that the powered device 150 is detached from the network connector 106, the voltage of the voltage source VDD is transferred through parasitic electronic components of the PSE circuit 102 to the second terminal N2 to induce the second non-zero voltage pulse 202. Under such a condition, the MOS switch 104 is turned off.

Such a pulse is detected by the detection unit 108 through the voltage-dividing point VDP of the resistor ladder 110. Subsequently, the detection unit 108 deactivates the power-supplying mechanism of the PSE circuit 102 at time T4 to stop generating the power. In an embodiment, the detection unit 108 may deactivate the power-supplying mechanism of the PSE circuit 102 by using such as, but not limited to a control signal CT.

In an embodiment, the current related to the second non-zero voltage pulse 202 is dissipated through the resistor ladder 110 such that under the condition that a voltage difference between the gate terminal G of the MOS switch 104 and the second terminal N2 is larger than a threshold voltage of the MOS switch 104, the MOS switch 104 is turned on such that the second terminal N2 receives the ground voltage of the ground terminal GND through the MOS switch 104. Under such a condition, the detection unit 108 does not detect the non-zero voltage pulse and does not control the PSE circuit 102.

When the detection mechanism is implemented in the PSE circuit 102, an additional amount of power consumption is presented since the PSE circuit 102 keeps detecting whether the powered device 150 is attached or detached.

On the contrary, the detection unit 108 in the present disclosure determines whether the powered device 150 is attached or detached by detecting the non-zero voltage pulse at the second terminal T2 of the network connector 106. Further, the detection unit 108 can be implemented by a circuit consuming less power, such as, but not limited to a microcontroller unit.

As a result, the power consumption in the PSE circuit 102 in the network device 100 of the present disclosure can be reduced to address the safety issue and accomplish the power consumption requirement.

Figure 3:
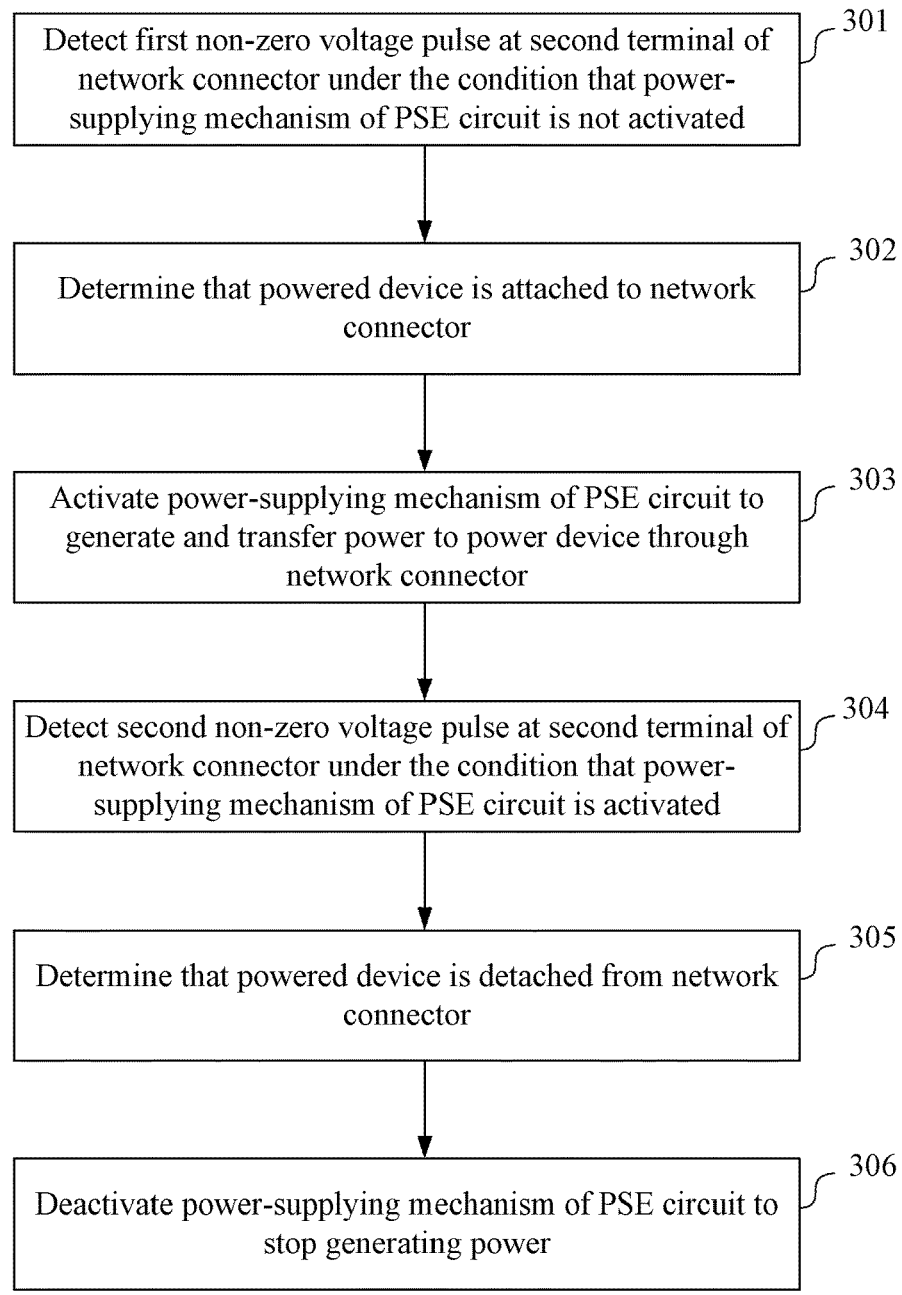
FIG. 3 is a flow chart of an operation method of the network device for supplying power over network in an embodiment of the present disclosure.

FIG. 3 is a flow chart of an operation method 300 of the network device 100 for supplying power over network in an embodiment of the present disclosure. The operation method 300 can be used in the network device 100 illustrated in FIG. 1. The operation method 300 includes the steps outlined below. The steps are not recited in the sequence in which the steps are performed. That is, unless the sequence of the steps is expressly indicated, the sequence of the steps is interchangeable, and all or part of the steps may be simultaneously, partially simultaneously, or sequentially performed.

In step 301, the first non-zero voltage pulse 200 is detected at the second terminal N2 by the detection unit 108 under the condition that the power-supplying mechanism of the PSE circuit 102 is not activated.

In step 302, the powered device 150 is determined to be attached to the network connector 106 by the detection unit 108.

In step 303, the power-supplying mechanism of the PSE circuit 102 is activated by the detection unit 108 to generate and transfer a power to the powered device 150 through the network connector 106.

In step 304, the second non-zero voltage pulse 202 is detected at the second terminal N2 by the detection unit 108 under the condition that the power-supplying mechanism of the PSE circuit 102 is activated.

In step 305, the powered device 150 is determined to be detached from the network connector 106 by the detection unit 108.

In step 306, the power-supplying mechanism of the PSE circuit 102 is deactivated by the detection unit 108 to stop generating the power.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A network device for supplying power over network, comprising:
    a power source device (PSE) circuit electrically coupled to a voltage source and a ground terminal;
    a MOS switch having a gate terminal electrically coupled to the PSE circuit and to receive a gate-driving voltage therefrom;
    a network connector having a first terminal electrically coupled to the voltage source and a second terminal electrically coupled to the ground terminal through the MOS switch; and
    a detection unit;
    wherein under the condition that a power-supplying mechanism of PSE circuit is not activated, the detection unit detects a first non-zero voltage pulse at the second terminal to determine that a powered device is attached to the network connector to activate the power-supplying mechanism of the PSE circuit to generate and transfer a power to the powered device through the network connector;
    under the condition that the power-supplying mechanism of the PSE circuit is activated, the detection unit detects a second non-zero voltage pulse at the second terminal to determine that the powered device is detached from the network connector to deactivate the power-supplying mechanism of the PSE circuit to stop generating the power.

2. The network device of claim 1, further comprising a voltage-dividing ladder comprising a plurality of voltage dividing elements electrically coupled in series and between the second terminal and the ground terminal, and the detection unit is electrically coupled to a voltage-dividing point of the voltage-dividing ladder such that the first voltage pulse and the second voltage pulse at the second terminal are detected through the voltage-dividing point by the detection unit.

3. The network device of claim 2, wherein under the condition that the first non-zero voltage pulse or the second non-zero voltage pulse is presented at the second terminal, the MOS switch is turned off.

4. The network device of claim 3, wherein a current related to the first non-zero voltage pulse or the second non-zero voltage pulse is dissipated through the resistor ladder such that under the condition that a voltage difference between the gate terminal of the MOS switch and the second terminal is larger than a threshold voltage of the MOS switch, the MOS switch is turned on such that the second terminal receives a ground voltage of the ground terminal through the MOS switch.

5. The network device of claim 2, wherein each of the voltage dividing elements is a resistor, a capacitor or an inductor.

6. The network device of claim 1, wherein under the condition that the powered device is attached to the network connector, the voltage of the voltage source is transferred through the first terminal of the network connector and the powered device to the second terminal of the network connector to induce the first non-zero voltage pulse.

7. The network device of claim 1, wherein under the condition that the powered device is detached from the network connector, the voltage of the voltage source is transferred through parasitic electronic components of the PSE circuit to the second terminal to induce the second non-zero voltage pulse.

8. The network device of claim 1, wherein the detection unit is a microcontroller unit (MCU) or an analog circuit.

9. The network device of claim 1, wherein the network connector is further configured to transfer communication signals to the powered device.

10. An operation method of a network device for supplying power over network comprising a power source device (PSE) circuit electrically coupled to a voltage source and a ground terminal, a MOS switch having a gate terminal electrically coupled to the PSE circuit to receive a gate-driving voltage therefrom, a network connector having a first terminal electrically coupled to the voltage source and a second terminal electrically coupled to the ground terminal through the MOS switch and a detection unit, wherein the operation method comprises:
  detecting a first non-zero voltage pulse at the second terminal by the detection unit under the condition that a power-supplying mechanism of the PSE circuit is not activated;
  determining that a powered device is attached to the network connector by the detection unit;
  activating the power-supplying mechanism of the PSE circuit by the detection unit to generate and transfer a power to the powered device through the network connector;
  detecting a second non-zero voltage pulse at the second terminal by the detection unit under the condition that the power-supplying mechanism of the PSE circuit is activated;
  determining that the powered device is detached from the network connector by the detection unit; and
  deactivating the power-supplying mechanism of the PSE circuit by the detection unit to stop generating the power.

11. The operation method of claim 10, wherein the network device further comprises a voltage-dividing ladder comprising a plurality of voltage dividing elements electrically coupled in series and between the second terminal and the ground terminal, and the detection unit is electrically coupled to a voltage-dividing point of the voltage-dividing ladder, wherein the operation method further comprises:
  detecting the first voltage pulse or the second voltage pulse through the voltage-dividing point by the detection unit.

12. The operation method of claim 11, further comprising:
  turning off the MOS switch under the condition that the first non-zero voltage pulse or the second non-zero voltage pulse is presented at the second terminal.

13. The operation method of claim 12, further comprising:
  dissipating a current related to the first non-zero voltage pulse or the second non-zero voltage pulse through the resistor ladder;
  turning on the MOS switch under the condition that a voltage difference between the gate terminal of the MOS switch and the second terminal is larger than a threshold voltage of the MOS switch; and
  receiving a ground voltage of the ground terminal by the second terminal through the MOS switch.

14. The operation method of claim 11, wherein each of the voltage dividing elements is a resistor, a capacitor or an inductor.

15. The operation method of claim 10, further comprising:
  transferring the voltage of the voltage source through the first terminal of the network connector and the powered device to the second terminal of the network connector to induce the first non-zero voltage pulse under the condition that the powered device is attached to the network connector.

16. The operation method of claim 10, further comprising:
  transferring the voltage of the voltage source through parasitic electronic components of the PSE circuit to the second terminal to induce the second non-zero voltage pulse under the condition that the powered device is detached from the network connector.

17. The operation method of claim 10, wherein the detection unit is a microcontroller unit or an analog circuit.

18. The operation method of claim 10, further comprising:
  transferring communication signals to the powered device by the network connector.

* * * * *